United States Patent

Doles et al.

(10) Patent No.: US 6,770,699 B2
(45) Date of Patent: Aug. 3, 2004

(54) INVESTMENT CASTING BINDERS FOR MAKING MOLDS HAVING HIGH GREEN STRENGTH AND LOW FIRED STRENGTH

(75) Inventors: Ronald S. Doles, LaGrange Park, IL (US); Gretchen L. Desch, Naperville, IL (US)

(73) Assignee: Nalco Company, Naperville, IL (US)

( * ) Notice: Subject to any disclaimer, the term of this patent is extended or adjusted under 35 U.S.C. 154(b) by 348 days.

(21) Appl. No.: 09/940,816

(22) Filed: Aug. 27, 2001

(65) Prior Publication Data

US 2003/0078334 A1 Apr. 24, 2003

(51) Int. Cl.$^7$ ............................................ C08K 3/34
(52) U.S. Cl. ........................................ 524/492; 524/493
(58) Field of Search .............................. 524/492, 493, 524/430

(56) References Cited

U.S. PATENT DOCUMENTS

| 5,391,606 | A | | 2/1995 | Doles |
| 5,677,371 | A | * | 10/1997 | Guerra, Jr. ................. 524/493 |
| 5,824,730 | A | | 10/1998 | Guerra, Jr. |
| 6,000,457 | A | | 12/1999 | Vandermeer |
| 6,020,415 | A | | 2/2000 | Guerra, Jr. |
| 6,257,316 | B1 | | 7/2001 | Vandermeer |

* cited by examiner

*Primary Examiner*—Katarzyna Wyrozebski
(74) *Attorney, Agent, or Firm*—Margaret M. Brumm; Thomas M. Breininger

(57) ABSTRACT

Investment casting binders containing a mixture of colloidal silicas having average particle size diameters of 4, 8 and 13 nanometers yield molds having high green strength and low fired strength.

4 Claims, No Drawings

INVESTMENT CASTING BINDERS FOR MAKING MOLDS HAVING HIGH GREEN STRENGTH AND LOW FIRED STRENGTH

FIELD OF THE INVENTION

This invention relates generally to investment casting and, more particularly, to a binder for making investment casting molds having high green strength and low fired strength.

BACKGROUND OF THE INVENTION

Investment casting, which has also been called lost wax, lost pattern and precision casting, is used to produce high quality metal articles that meet relatively close dimensional tolerances. Typically, an investment casting is made by first constructing a thin-walled ceramic mold, known as an investment casting shell, into which a molten metal can be introduced.

Shells are usually constructed by first making a facsimile or pattern from a meltable substrate of the metal object to be made by investment casting. Suitable meltable substrates may include, for example, wax, polystyrene or plastic.

Next, a ceramic shell is formed around the pattern. This may be accomplished by dipping the pattern into a slurry containing a mixture of liquid refractory binders such as colloidal silica or ethyl silicate, plus a refractory powder such as quartz, fused silica, zircon, alumina or aluminosilicate and then sieving dry refractory grains onto the freshly dipped pattern. The most commonly used dry refractory grains include quartz, fused silica, zircon, alumina and aluminosilicate.

The steps of dipping the pattern into a refractory slurry and then sieving onto the freshly dipped pattern dry refractory grains may be repeated until the desired thickness of the shell is obtained. However, it is preferable if each coat of slurry and refractory grains is air-dried before subsequent coats are applied.

The shells are built up to a thickness in the range of about ⅛ to about ½ of an inch (from about 0.31 to about 1.27 cm). After the final dipping and sieving, the shell is thoroughly air-dried. The shells made by this procedure have been called "stuccoed" shells because of the texture of the shell's surface.

The shell is then heated to at least the melting point of the meltable substrate. In this step, the pattern is melted away leaving only the shell and any residual meltable substrate. The shell is then heated to a temperature high enough to vaporize any residual meltable substrate from the shell. Usually before the shell has cooled from this high temperature heating, the shell is filled with molten metal. Various methods have been used to introduce molten metal into shells including gravity, pressure, vacuum and centrifugal methods. When the molten metal in the casting mold has solidified and cooled sufficiently, the casting may be removed from the shell.

Investment casting molds must withstand significant mechanical and drying stresses during their manufacture. Ceramic shells are designed having high green (air dried) strength to prevent damage during the shell building process. Once the desired mold thickness is achieved, it is dewaxed and preheated to approximately 1800° F. At this point, it is removed from the high temperature furnace and immediately filled with liquid (molten) metal. If the mold deforms while the metal is solidifying (or in a plastic state), the casting dimensions will likely be out of specification. To prevent high temperature deformation, molds are designed to have substantial hot strength. Once the casting is solidified and cooled, low fired strength is desired to facilitate the knockout or removal of the ceramic mold from the metal casting.

Most investment casting molds contain significant quantities of silica. The silica usually starts as an amorphous (vitreous) material. Fused silicas and aluminosilicates are the most common mold materials. When exposed to temperatures above approximately 1800° F., amorphous silica devitrifies (crystallizes) forming beta cristobalite. Cristobalite has low (alpha) and high (beta) temperature forms. The beta form has a specific gravity very close to that of amorphous silica so mold dimensions remain constant and stresses associated with the phase transformation are minimal. Upon cooling, beta cristobalite transforms to the alpha form. This phase transformation is accompanied by an approximate 4% volume change that creates numerous cracks in the shell, thereby facilitating mold removal. Cristobalite reduces the fired strength of silica containing investment casting molds.

Although investment casting has been known and used for thousands of years, the investment casting market continues to grow as the demand for more intricate and complicated parts increase. Because of the great demand for high-quality, precision castings, there continuously remains a need to develop new ways to make investment casting shells more efficiently, cost-effective and defect-free. For instance, if shell strength was maintained to the point of metal solidification, followed by a reduction in strength as the shell cools, improvements in productivity could be realized through improved knockout (shell removal). This is particularly desirable for alloys of aluminum and magnesium because their melting and pouring temperatures are insufficient to promote cristobalite formation and easy knockout.

Aluminum (and magnesium) castings produced by investment casters are rather fragile, so they are cleaned by water or sand blasting, compared with the aggressive shot blast and vibratory cleaning for steel and high temperature alloy castings. Residual ceramic on steel castings is dissolved away using concentrated acids and bases or molten salt baths. Chemical incompatibility excludes their use on aluminum and magnesium. If a binder was developed having low fired strength and associated easy knockout properties upon exposure to temperatures at or below 1800° F., aluminum casting cleanup could be greatly improved.

It is known that cristobalite formation is a temperature and time dependent transformation that is proportional to the reactivity of the silica species. High surface area (small particle) silicas transform at a faster rate than low surface area species. Colloidal silica transforms more quickly than the refractory materials that it binds in the investment casting mold. Additionally, it is reported that certain elements (e.g., sodium) can act as promoters or catalysts for the transformation. The higher the surface area (or smaller the particle diameter) of a colloidal silica, the faster the transformation. Traditionally, colloidal silicas below 7 nanometers have mediocre green strength, low solids concentrations and low fired strengths, making them marginal investment casting binders. Larger particle silicas demonstrate high green strength, but fired strengths can be too high for aluminum applications. If a way of incorporating the best of both colloidal silicas could be found, (sufficient strength for handling and casting, combined with improved knockout) a beneficial investment casting binder would be obtained.

Accordingly, it would be desirable to provide an improved binder for making investment casting molds having high green strength and low fired strength.

SUMMARY OF THE INVENTION

The present invention is directed to a binder containing a mixture of colloidal silicas having average particle size diameters of 4, 8 and 13 nanometers. When the inventive binder is used to make investment casting molds, the molds have a high green strength and low fired strength.

DETAILED DESCRIPTION OF THE INVENTION

The present invention is directed to a binder for making investment casting molds. In accordance with the invention, the binder contains a mixture of colloidal silicas having average particle size diameters of 4, 8 and 13 nanometers (nm).

As used herein, "colloidal silica" is defined as an aqueous dispersion of minute silica particles having diameters ranging from 2–100 nm, usually employing a small amount of a strong base, such as ammonium hydroxide, sodium hydroxide or potassium hydroxide, as a stabilizer to yield a stable suspension. The resulting pH is typically in the range of 8.0 to 11.0 and the silica content is usually 5 to 50% by weight.

Also, it is generally known to those skilled in the art that particle size varies depending on the method employed to calculate it. Accordingly, as used herein, "4 nm" is understood to include particle sizes in the range of about 3–5 nm, "8 nm" is understood to include particle sizes in the range of about 7–9 nm, and "13 nm" is understood to include particle sizes in the range of about 11–16 nm.

In accordance with this invention, it is preferred that the amount of 4 nm colloidal silica in the mixture be in the range of about 20% to about 70% by weight, the amount of 8 nm colloidal silica in the mixture be in the range of about 10% to about 40% by weight, and the amount of 13 nm colloidal silica in the mixture be in the range of about 10% to about 40% by weight. More preferably, the amount of 4 nm colloidal silica in the mixture is about 44% by weight, the amount of 8 nm colloidal silica in the mixture is about 28% by weight and the amount of 13 nm colloidal silica in the mixture is about 28% by weight. All percentages are expressed on a silica solids basis. The mixture of colloidal silica can be prepared by any conventional method.

The binder may also optionally contain one or more polymers. The polymers may be latex polymers, water-soluble polymers or mixtures thereof. Suitable latex polymers include, but are not limited to, vinyl acetates, polyvinyl chlorides, acrylics and styrene butadienes. Water-soluble polymers which may be used include, but are not limited to, polyvinyl alcohols and various cellulose ethers. The concentration of polymer(s) in the binder is preferably between about 0.25 and about 20 weight percent.

In an alternative embodiment of present invention, the binder contains at least 30% silica particles which have average diameters less than about 4 nm and a solids content greater than about 15%. It is preferred that the average diameter of the silica particles be in the range of about 5.5 nm to about 8.5 nm. In addition, about 90% of the silica particles preferably have average diameters in the range of about 2 nm to about 16 nm.

The present inventors have discovered that making investment casting molds with the inventive binder yields molds having high green strength and low fired strength. The molds were found to have sufficient strength to produce defect-free castings with acceptable dimensional accuracy. Moreover, steel and aluminum alloy castings produced using these molds were of similar quality to standard production castings, but mold removal (knockout) was improved. The improved knockout provided increased productivity and less damage to the aluminum castings.

EXAMPLES

The following examples are intended to be illustrative of the present invention and to teach one of ordinary skill how to make and use the invention. These examples are not intended to limit the invention or its protection in any way.

Example 1

Slurries were prepared using the following formulas:

TABLE 1

| Slurry Ingredients | Concentrations (ratios) |
| --- | --- |
| Colloidal silica[1] | 1540 g |
| Deionized water | 660 g |
| Latrix ® 6305 polymer[2] | 129 g |
| Nalcast ® P1 (−200 mesh) fused silica[3] | 1225 g |
| Nalcast ® P2 (−120 mesh) fused silica[4] | 3675 g |
| Nalco ® 8815 anionic wetting agent[5] | 1.0 g |
| Dow Corning ® Y-30 antifoam[6] | 4.0 g |

[1]Nalco ® 00MD028 (7 nanometer, sodium stabilized, inventive binder) (available from ONDEO Nalco Company)
[2]Styrene butadiene latex (available from ONDEO Nalco Company)
[3]Available from ONDEO Nalco Company
[4]Available from ONDEO Nalco Company
[5]70% sodium dioctyl sulfosuccinate (available from ONDEO Nalco Company)
[6]30% silicone emulsion (available from Dow Corning Corporation of Midland, Michigan)

TABLE 2

| Comparative Slurry Ingredients | Concentrations (ratios) |
| --- | --- |
| Colloidal silica[1] | 1015 g |
| Deionized water | 1160 g |
| Latrix ® 6305 polymer[2] | 129 g |
| Nalcast ® P1 (−200 mesh) fused silica | 1237 g |
| Nalcast ® P2 (−120 mesh) fused silica | 3712 g |
| Nalco ® 8815 anionic wetting agent | 1.0 g |
| Dow Corning ® Y-30 antifoam | 4.0 g |

[1]Nalcoag ® 1130 (8 nanometer, sodium stabilized, conventional binder) (available from ONDEO Nalco Company)
[2]Styrene butadiene latex (available from ONDEG Nalco Company)

After forty-eight hours of mixing, the viscosities of the backup slurries were measured and adjusted using a number four Zahn cup. Minor binder (colloidal silica+water+polymer) or flour (P1 and P2 fused silica) additions were made to obtain the desired rheology. Once adjusted, the slurries were ready for dipping.

Wax patterns were cleaned and etched using Nalco® 6270 pattern cleaner (diluted 3 parts deionized water to 1 part Nalco® 6270) followed by a water rinse. Wax bars were first dipped into a primary slurry and stuccoed with zircon sand stucco (applied by the rainfall method). The first backup coat was applied by dipping in each backup slurry and stuccoing with Nalcast® S1 (50×100 mesh) fused silica stucco (applied by rainfall method). Backup coats two through four were stuccoed with Nalcast® S2 (30×50 mesh) fused silica (applied by the rainfall method). The final shells had one prime and four backup coats plus one seal coat (no stucco). All coats were dried at 72° F., 29% relative humidity and air flows of 200–300 feet per minute. After a seventy-two hour final dry, the shells were placed into a desiccator for a minimum of twenty-four hours prior to testing.

Several shell properties were evaluated using 1×8×¼ in modulus of rupture (MOR) bars prepared from the experimental slurries. The bars were broken with a three point bending fixture on an ATS universal test machine (available from Applied Test Systems, Inc. of Butler, Pa.). The following physical properties were determined for the MOR specimens: Fracture Load The fracture load is the maximum load that the test specimen is capable of supporting. The higher the load, the stronger the test specimen. It is affected by the shell thickness, slurry and shell composition. This property is important for predicting shell cracking and related casting defects. The fracture load is measured and recorded for test specimens in the green (air dried), fired (held at 1800° F. for one hour and cooled to room temperature) and hot (held at 1800° F. for one hour and broken at temperature) condition. Results are normalized and expressed as an Adjusted Fracture Load (AFL). The AFL is simply the fracture load divided by the specimen width for a two inch test span.

Modulus of Rupture

Test specimens are broken using a three point loading apparatus on an ATS universal test machine. MORs are calculated for bars in the green, fired and hot conditions.

$$MOR = \frac{3PL}{2bh^2}$$

where P=Fracture load in pounds

L=Specimen length in inches (distance between supports)

b=Specimen width at point of failure in inches h=Specimen thickness at point of failure in inches The MOR is a fracture stress. It is influenced by fracture load and specimen dimensions. Shell thickness is of particular importance since the stress is inversely proportional to this value squared. The uneven nature of the shell surface makes this dimension difficult to accurately measure, resulting in large standard deviations. This deficiency is overcome by breaking and measuring a sufficient number of test specimens.

Nalcoag® 1130 (conventional) and Nalco® 00MD028 (invention subject) colloidal silica binders diluted to 14% solids and enhanced with 6% Latrix® 6305 were used to make fused silica backup slurries. Four backup coats were applied to wax test bars with S1 fused silica stucco for the first backup coat and S2 fused silica stucco for backup coats two through four. Green strength testing was conducted on desiccant dried samples, while fired testing occurred after a 2 hour heat treatment at 1800° F. As shown below in Table 3, remarkable results were obtained. At 14% colloidal silica, shells made with the Nalco® 00MD028 binder had a fired/green MOR and fired/green AFL ratio nearly 40% lower than shells made with Nalcoag® 1130.

TABLE 3

| Composition | Green | | Fired (2 hr at 1800 F.) | | Fired/Green | |
|---|---|---|---|---|---|---|
| | MOR | AFL | MOR | AFL | MOR | AFL |
| Nalco ® 00MD028 at 14% | 521 | 6.86 | 399 | 5.96 | 0.77 | 0.87 |
| Nalcoag ® 1130 at 14% | 591 | 7.31 | 747 | 10.21 | 1.26 | 1.40 |

Example 2

Slurries were prepared using the following formulas:

TABLE 4

| Slurry Ingredients | Concentrations (ratios) |
|---|---|
| Colloidal silica[1] | 2395 g |
| Deionized water | 87 g |
| Latrix ® 6305 polymer[2] | 149 g |
| Nalcast ® P2 (−120 mesh) fused silica | 5050 g |

TABLE 4-continued

| Slurry Ingredients | Concentrations (ratios) |
|---|---|
| Nalco ® 8815 anionic wetting agent | 0.5 g |
| Dow Corning ® Y-30 antifoam | 1.0 g |

[1]Nalco ® 00MD028 (7 nanometer, sodium stabilized, inventive binder) (available from ONDEO Nalco Company)
[2]Styrene butadiene latex (available from ONDEO Nalco Company)

TABLE 5

| Comparative Slurry Ingredients | Concentrations (ratios) |
|---|---|
| Colloidal silica[1] | 2401 g |
| Latrix ® 6305 polymer[2] | 145 g |
| Nalcast ® P2 (−120 mesh) fused silica | 5000 g |
| Nalco ® 8815 anionic wetting agent | 0.5 g |
| Dow Corning ® Y-30 antifoam | 1.0 g |

[1]Nalcoag ® 1115 (4 nanometer, sodium stabilized, conventional binder) (available from ONDEO Nalco Company)
[2]Styrene butadiene latex (available from ONDEO Nalco Company)

Slurry preparation procedures were the same as described above in Example 1. Shell test methods were also the same, with the exception that fired strength testing was conducted on samples held at 1800° F. for 1 hour. Nalco® 00MD028 (inventive binder) diluted to 20% and Nalcoag® 1115 (conventional binder) colloidal silica binders enhanced with 6% Latrix® 6305 were used to make fused silica backup slurries. Green strength testing was conducted on desiccant dried samples, while fired testing occurred after the test specimens were subjected to a 1 hour heat treatment at 1800° F. and cooled. Ceramic bars for strength testing were prepared similarly to those in Example 1 with the following changes. Wax patterns were cleaned and etched with Nalco® 94MD008 pattern cleaner followed by a water rinse. Dry times started at 2 hours and progressed up to 5.25 hours as additional coats were applied. All coats were dried at 70° F., 20% relative humidity and air flows of 200–300 feet per minute.

The results contained in Table 6 below illustrate that low fired strength with high green strength cannot be achieved with Nalcoag® 1115. Shells prepared with the 100% Nalcoag® 1115 slurry system have a reduced fired strength, however the green strength is too low for confident usage.

TABLE 6

| Composition | Green | | Fired (1 hr at 1800 F.) | | Fired/Green | |
|---|---|---|---|---|---|---|
| | MOR | AFL | MOR | NFL | MOR | AFL |
| Nalco ® 00MD028 at 20% | 503 | 11.85 | 237 | 5.60 | 0.47 | 0.47 |
| Nalcoag ® 1115 | 398 | 8.55 | 165 | 3.66 | 0.41 | 0.43 |

Example 3

Slurries were prepared using the following formulas:

TABLE 7

| Slurry Ingredients | Concentrations (ratios) |
|---|---|
| Colloidal silica[1] | 2097 g |
| Deionized water | 462 g |
| Latrix ® 6305 polymer[2] | 19 g |
| Fused silica (−170 mesh)[3] | 1424 g |
| Mulgrain Aluminosilicate (−325 mesh M60)[4] | 4273 g |
| Mulgrain Aluminosilicate (50 × 100 mesh M47)[5] | 1424 g |

TABLE 7-continued

| Slurry Ingredients | Concentrations (ratios) |
| --- | --- |
| Nalco ® 8815 anionic wetting agent | 0.5 g |
| Dow Corning ® Y-30 antifoam | 1.0 g |

[1]Nalco ® 00MD028 (7 nanometer, sodium stabilized, inventive binder) (available from ONIDEO Nalco Company)
[2]Styrene butadiene latex (available from ONDEO Nalco Company)
[3]Available from C-E Minerals, Teco Operation, Greenville, TN
[4]Available from C-E Minerals, Andersonville, GA
[5]Available from C-E Minerals, Andersonville, GA

TABLE 8

| Comparative Slurry Ingredients | Concentrations (ratios) |
| --- | --- |
| Colloidal silica[1] | 1871 g |
| Deionized water | 412 g |
| Latrix ® 6305 polymer[2] | 211 g |
| Fused silica (−170 mesh) | 1406 g |
| Mulgrain Aluminosilicate (−325 mesh M60) | 4220 g |
| Mulgrain Aluminosilicate (50 × 100 mesh M47) | 1406 g |
| Nalco ® 8815 anionic wetting agent | 0.5 g |
| Dow Corning ® Y-30 antifoam | 1.0 g |

[1]Nalco ® 00MD028 (7 nanometer, sodium stabilized, inventive binder) (available from ONDEO Nalco Company)
[2]Styrene butadiene latex (available from ONDEO Nalco Company)

Nalco® 00MD028 (inventive binder) diluted to 17% colloidal silica enhanced with 0.8% and 9.2% Latrix® 6305 was used to make fused silica/aluminosilicate backup slurries. The slurry preparation, shell preparation and shell testing procedures were the same as described in Example 2, except for the following. Slurry viscosities were measured and adjusted using a number five Zahn cup. Mulgrain M47 (20×50 mesh) aluminosilicate stucco was applied to the first and second backups, while backup coats 3 and 4 were stuccoed with Mulgrain M47 (22S mesh) aluminosilicate. All coats were dried at 78° F., 20 to 40% relative humidity and air flows of 200–300 feet per minute.

The results shown below in Table 9 demonstrate the lower fired/green strength ratios with increased polymer. The shell system containing 9.2% Latrix® 6305 had fired to green ratios 25 to 30% lower than for shells containing 0.8% Latrix® 6305.

TABLE 9

| | Green | | Fired (1 hr at 1800 F.) | | Fired/Green | |
| --- | --- | --- | --- | --- | --- | --- |
| Composition | MOR | AFL | MOR | AFL | MOR | AFL |
| Latrix ® 6305 at 0.8% | 590 | 11.86 | 616 | 11.93 | 1.04 | 1.01 |
| Latrix ® 6305 at 9.2% | 564 | 10.86 | 419 | 8.24 | 0.74 | 0.76 |

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

What is claimed is:

1. A binder for making an investment casting mold comprising a mixture of colloidal silicas, wherein the colloidal silicas have average particle size diameters of 4, 8 and 13 nanometers and wherein the 4 nanometer colloidal silica is present in the mixture in an amount of about 20% to about 70% by weight, the 8 nanometer colloidal silica is present in the mixture in an amount of about 10% to about 40% by weight and the 13 nanometer colloidal silica is present in the mixture in an amount of about 10% to about 40% by weight.

2. A binder for making an investment casting mold comprising a mixture of colloidal silicas, wherein the colloidal silicas have average particle size diameters of 4, 8 and 13 nanometers and wherein the 4 nanometer colloidal silica is present in the mixture in an amount of about 44% by weight, the 8 nanometer colloidal silica is present in the mixture in an amount of about 28% by weight and the 13 nanometer colloidal silica is present in the mixture in an amount of about 28% by weight.

3. A binder for making an investment casting mold comprising a mixture of colloidal silicas, wherein the colloidal silicas have average particle size diameters of 4, 8 and 13 nanometers, wherein the 4 nanometer colloidal silica is present in the mixture in an amount of about 20% to about 70% by weight, the 8 nanometer colloidal silica is present in the mixture in an amount of about 10% to about 40% by weight and the 13 nanometer colloidal silica is present in the mixture in an amount of about 10% to about 40% by weight, further comprising at least one polymer selected from the group consisting of latex polymers, water-soluble polymers and mixtures thereof.

4. A binder for making an investment casting mold comprising a mixture of colloidal silicas, wherein the colloidal silicas have average particle size diameters of 4, 8 and 13 nanometers and wherein the 4 nanometer colloidal silica is present in the mixture in an amount of about 44% by weight, the 8 nanometer colloidal silica is present in the mixture in an amount of about 28% by weight and the 13 nanometer colloidal silica is present in the mixture in an amount of about 28% by weight, further comprising at least one polymer selected from the group consisting of latex polymers, water-soluble polymers and mixtures thereof.

* * * * *